United States Patent [19]
Nakamura et al.

[11] Patent Number: 5,142,416
[45] Date of Patent: Aug. 25, 1992

[54] REFLECTION-TYPE PHOTOELECTRIC SWITCH, FRESNEL LENS AND METHOD OF MANUFACTURING SAID LENS

[75] Inventors: Arata Nakamura, Kyoto; Tetuya Akagi, Takatsuki; Fumihiko Misumi, Ibaraki; Satoru Shimokawa, Mukou; Shinya Tamino, Kusatsu, all of Japan

[73] Assignee: Omron Corporation, Kyoto, Japan

[21] Appl. No.: 480,620

[22] Filed: Feb. 15, 1990

[30] Foreign Application Priority Data

Feb. 20, 1989 [JP] Japan .................................. 1-39867
Jan. 30, 1990 [JP] Japan .................................. 2-18028

[51] Int. Cl.⁵ ............................ G02B 3/06; G02B 5/10
[52] U.S. Cl. .................................... 359/742; 359/711; 359/868
[58] Field of Search ............... 350/452, 628, 630, 629, 350/433, 434; 359/742, 743, 710, 711, 867, 868, 869

[56] References Cited

U.S. PATENT DOCUMENTS 3,470,423  9/1969  Larew ............................ 361/174
4,203,652  5/1980  Hanada .......................... 350/421

FOREIGN PATENT DOCUMENTS

A-3004691  8/1980  Fed. Rep. of Germany.
A-59-125709  11/1984  Japan.
A-62-134603  11/1987  Japan.
A-63-046402  7/1988  Japan.

Primary Examiner—Scott J. Sugarman
Attorney, Agent, or Firm—Dickstein, Shapiro & Morin

[57] ABSTRACT

A reflective-type photoelectric switch projects emitted light from a light-emitting element toward a detection zone by a light-projecting optical system, and guides reflected light from an object to be detected in the detection zone to a light-receiving element by a light-receiving optical system. A special optical element is used in part of at least one of the two optical systems. The optical element functions to diverge light in a direction parallel to a plane containing the optic axes of the light-emitting and light-receiving elements, and condense light in a direction perpendicular to the same plane. As a result, it is possible to detect, with excellent sensitivity, both an object which is far from the switch and an object very near the switch.

24 Claims, 18 Drawing Sheets

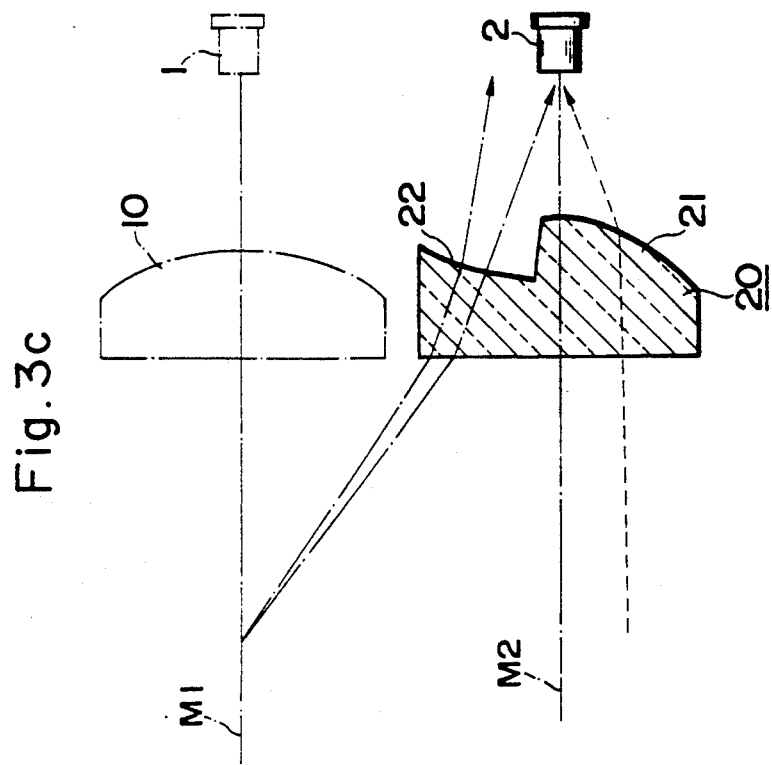
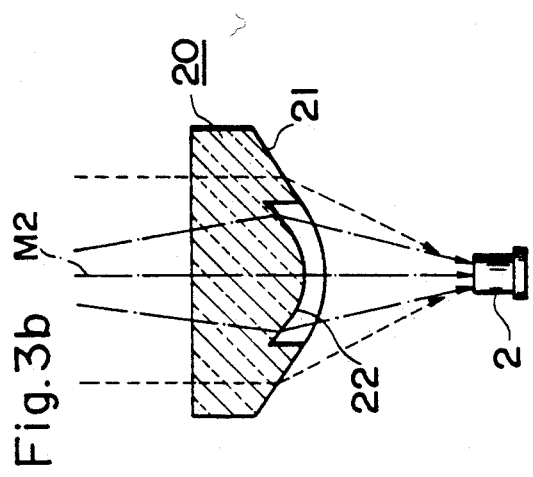
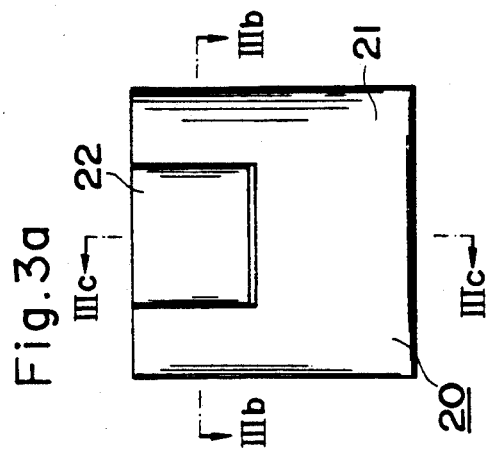

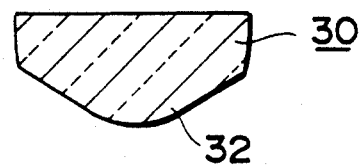
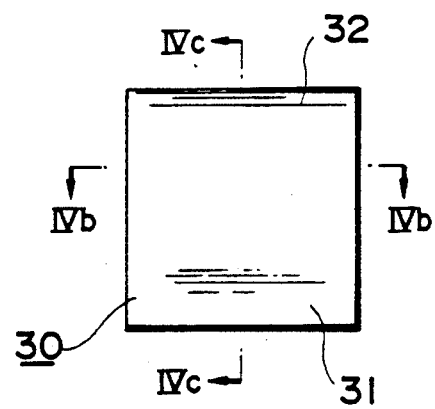
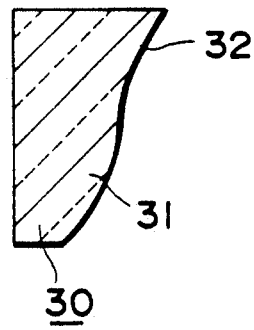

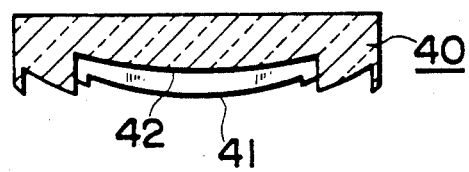
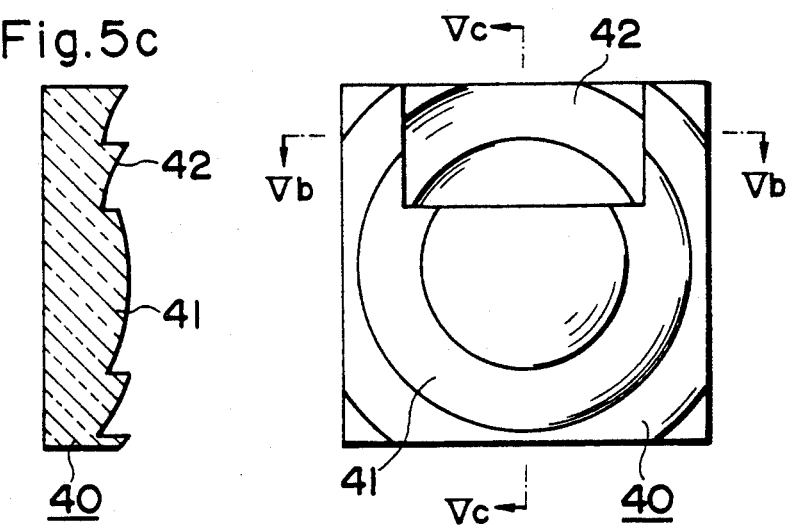

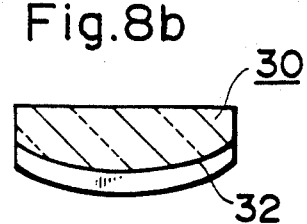
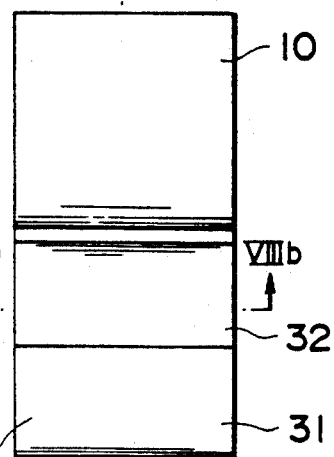
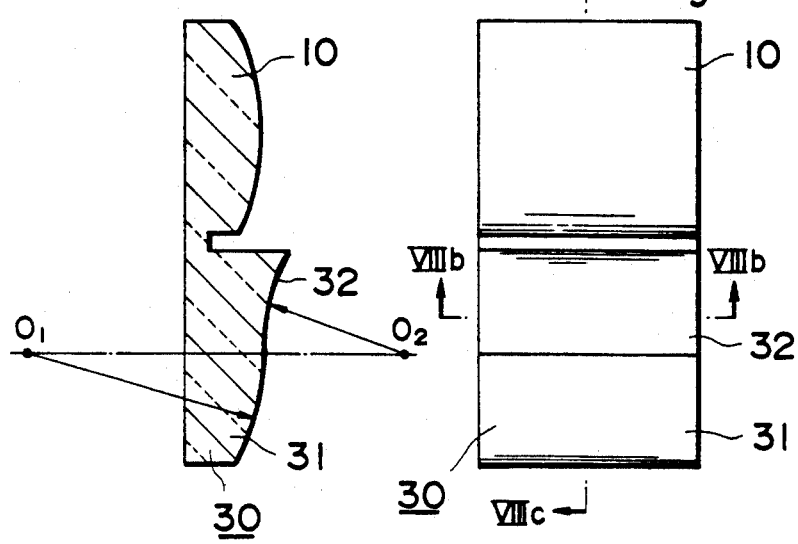
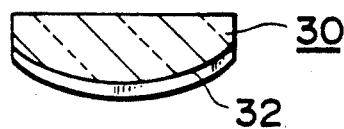
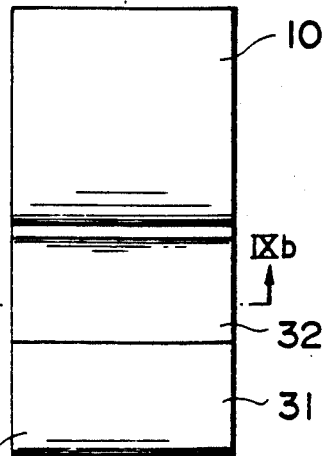
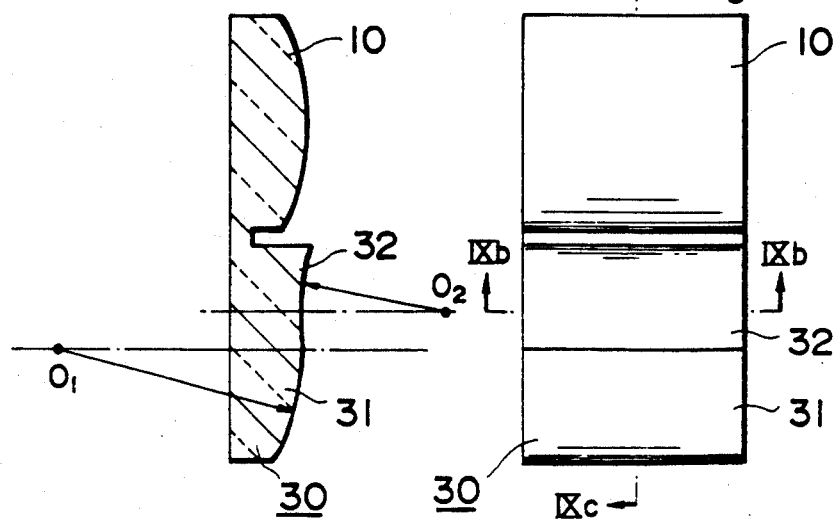

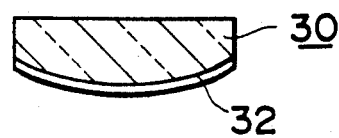
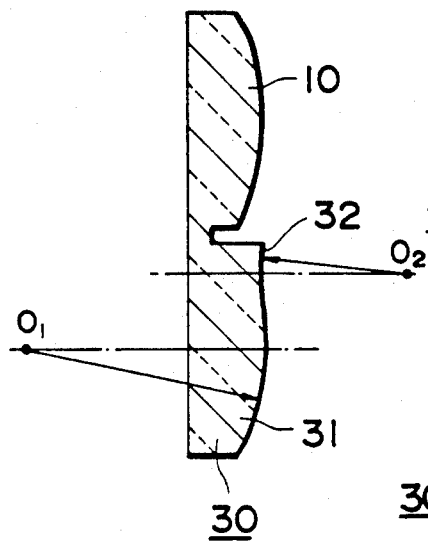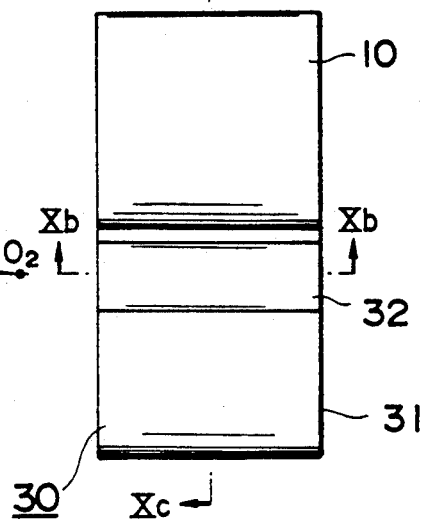
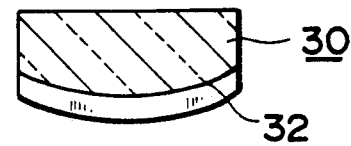
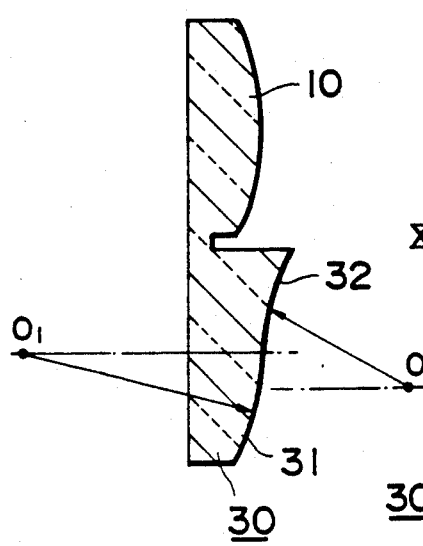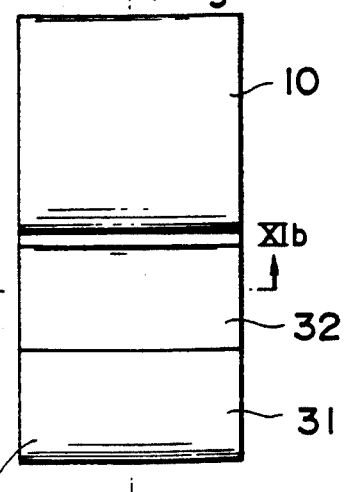

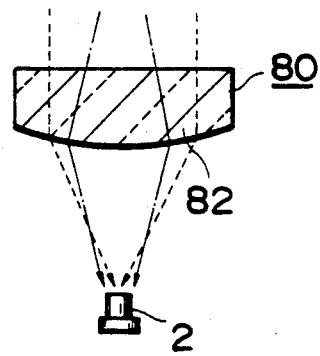
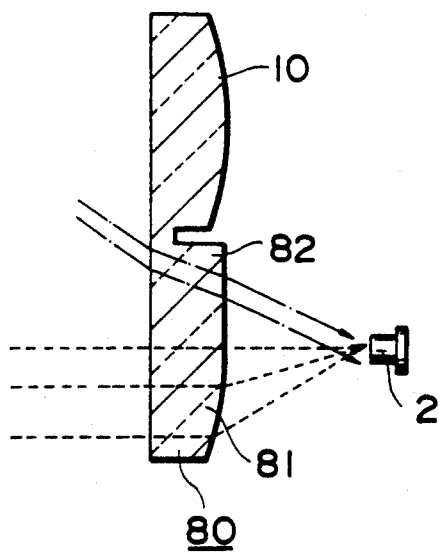 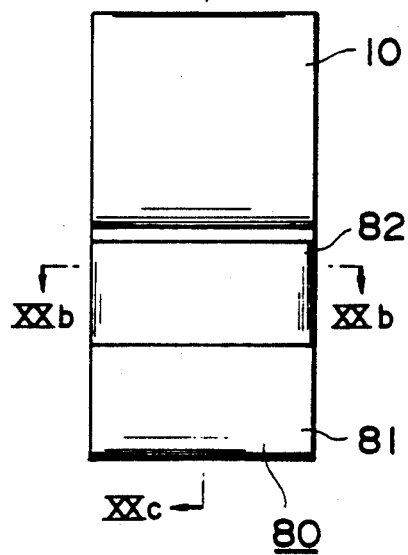

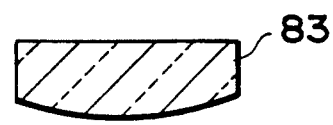
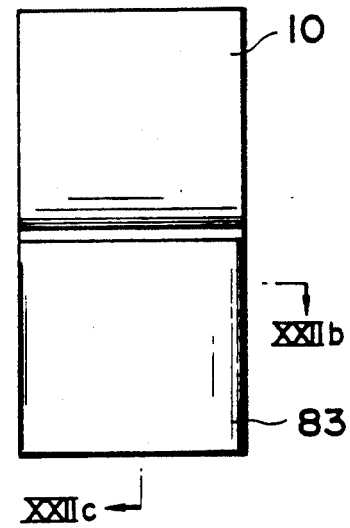
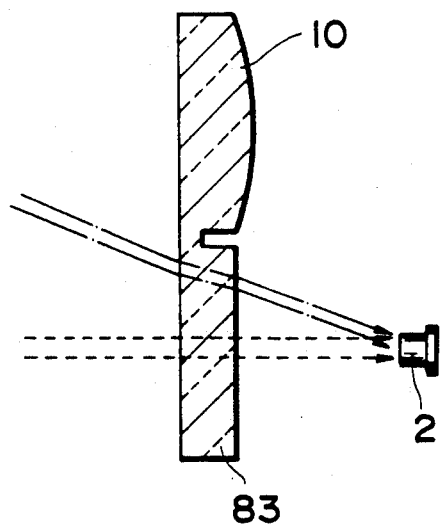

REFLECTION-TYPE PHOTOELECTRIC SWITCH, FRESNEL LENS AND METHOD OF MANUFACTURING SAID LENS

BACKGROUND OF THE INVENTION

1. Field of the Invention

This invention relates to a reflective-type photoelectric switch, a Fresnel lens capable of being used effectively in the reflective-type photoelectric switch, and a method of manufacturing the lens.

2. Description of Related Art

FIG. 24 illustrates a portion of a conventional reflective-type photoelectric switch. This reflective-type photoelectric switch is equipped with a light-emitting element 1, a light-projecting convex lens 101 for collimating light emitted by the light-emitting element 1 and projecting the collimated light toward a detection zone, a light-receiving convex lens 102 for condensing light reflected from an object to be sensed located in the detection zone, and a light-receiving element 2 for receiving the light, which is condensed by the light-receiving lens 102, and outputting a signal indicative of the light received. The switch is adapted to output a signal, which indicates detection of the object, based on the output signal of the light-receiving element 2. The light-emitting element 1 and light-receiving element 2 are optically shielded from each other by a barrier.

The conventional reflective-type photoelectric switch employs the convex lenses as an optical system for receiving light. Accordingly, though the object to be sensed can be sensed if it is at a distance remote from the photoelectric switch, it cannot be sensed if it is in close proximity to the switch.

The curve represented by the dashed line indicated at A in FIG. 7 illustrates the sensitivity of the conventional reflective-type electromagnetic switch. The horizontal axis in FIG. 7 represents the distance from the photoelectric switch to the object to be sensed, and the vertical axis represents the level (received-light output) of the output signal from the light-receiving element 2. The object is capable of being sensed within a range in which the received light output exceeds a threshold value. The received light output of the conventional photoelectric switch indicated by the curve A declines sharply very near the switch, and the range of distances very near the switch is a blind zone in which the object cannot be sensed.

A structure with a lens arrangement so adapted as to make possible detection of an object not only in a remote region but also at very short distances is disclosed in Japanese Patent Application Laid-Open (KOKAI) No. 59-125709. In the structure having this arrangement, the light-projecting lens and light-receiving lens are both constituted by convex lenses, and a concave lens is provided between the light-projecting convex lens and the light-receiving convex lens so as to correspond to a light-emitting element, and the concave lens is arranged in proximity to the light-projecting convex lens or is integrated with the light-projecting convex lens. A portion of the light emitted by the light-emitting element is collimated by the light-projecting convex lens and is projected off into the distance. The remaining portion of the light emitted by the light-emitting element is diverged to irradiate the range of short distances by the concave lens. As a result, the projected light and the range of detection are widened over a range of from very short to long distances.

With the structure having the foregoing lens arrangement, however, the concave lens is used in order to irradiate the range of short distances. Consequently, the projected light is diverged equally in all directions and therefore the intensity of the projected light is low at very short distances. As a result, there are cases where received-light output of the light-receiving element cannot attain a level high enough to enable detection of the object. Detection at very short distances becomes unstable particularly with regard to an object exhibiting low reflectance. Furthermore, since the projected light is diverged by the concave lens, as mentioned above, the detection zone is broadened and an object at a specific position cannot be detected. Thus, various problems arise.

SUMMARY OF THE INVENTION

An object of the present invention is to provide a reflective-type photoelectric switch in which received-light output at very short distances is enlarged so that an object to be detected can be detected at high sensitivity both at long and very short distances.

Another object of the present invention is to provide a reflective-type photoelectric switch in which it is possible to limit the detection zone so that an object at a specific position can be detected.

A further object of the present invention is to provide a Fresnel lens well suited for use in the aforementioned reflective-type photoelectric switch, as well as a method of manufacturing the Fresnel lens.

A reflective-type photoelectric switch in accordance with the present invention is characterized by comprising a light-emitting element, a light-projecting optical system for projecting emitted light from the light-emitting element toward a detection zone, a light-receiving element, and a light-receiving optical system for guiding reflected light from an object to be detected, which is located in the detection zone, toward the light-receiving element, at least one of the light-projecting optical system and light-receiving optical system including an optical element for diverging light in a direction parallel to a plane which contains an optic axis of the light-emitting element and an optic axis of the light-receiving element, and for condensing light in a direction perpendicular to the same plane.

The optical element is realized by a bulk lens consisting of glass, plastic or the like for refracting light by the convex or concave surface of the lens body, a reflector having a concave or convex reflecting surface from which reflected light is condensed or diverged, or a Fresnel lens comprising a plurality of annular or linear band-shaped lens portions.

The above-described optical element preferably is provided in the light-receiving optical system. In this arrangement, the light emitted by the light-emitting element passes through the light-projecting optical system to be converted into collimated light or condensed light which is projected toward the detection zone. The light diffusely reflected from the object residing in the detection zone is received by the light-receiving element via the light-receiving optical system. In a case where the object to be detected is comparatively far, the reflected light from the object is condensed on the light-receiving surface of the light-receiving element mainly by the portion (e.g., the convex lens portion) conventionally incorporated in the light-receiving optical system to perform the light-condensing operation. In a case where the object to be detected is at a very short distance, the reflected light from the object is guided onto the light-receiving surface of the light-receiving element mainly by the abovementioned optical element. More specifically, the reflected light from the object located at a very short distance is diverged in a direction parallel to a plane containing the optic axis of the light-emitting element and the optic axis of the light-receiving element, whereby some of the light is made to impinge upon the light-receiving element. The reflected light is condensed in a direction perpendicular to the same plane, among which some of light passing along the same path (as viewed from the abovementioned plane) as the light which impinges upon the light-receiving element is incident upon the light-receiving element. Thus, even if the object to be detected is located at a very short distance, the light reflected from the object is condensed in the direction perpendicular to the abovementioned plane, and some of this light is incident upon the light-receiving element. As a result, the received-light output at very short distances can be greatly enlarged. This makes possible highly sensitive detection of the object over a wide range of from very short to long distances. In a case where the aforementioned optical element is provided in the light-receiving optical system, it is not always necessary to provide the light-projecting optical system with the optical element (although providing the optical element in this optical system is of course permissible). If the light-projecting optical system is not provided with the optical element, it will suffice if the light-projecting optical system is made to perform the action of collimating or condensing the projected light. The detection zone is limited to the area illuminated by the light projected from the light-projecting optical system, so that it is possible for the detection zone to be restricted to a narrow region. As a result, an object can be detected at a specific position.

In the case where the optical element is provided in the light-projecting optical system, some of the projected light is diverged, at short distances, in the direction parallel to the plane containing the optic axis of the light-emitting element and the optic axis of the light-receiving element, and therefore the area forward of the light-receiving optical system is also illuminated by the projected light so that it is possible to detect an object at this position. Moreover, since the projected light is condensed in the direction orthogonal to the aforementioned plane, the projected light has an intensity higher, and therefore the light-receiving element has a higher output level, than in the lens arrangement disclosed in the abovementioned laid-open publication. In addition, since the detection zone is merely widened solely in the direction parallel to the aforementioned plane, it is possible to detect an object in a comparatively restricted area.

A Fresnel lens in accordance with the present invention is characterized in that it is constituted by a convex lens-type Fresnel lens portion and a toric Fresnel lens portion, the toric Fresnel lens portion is composed of a combination of a plurality of linear band-shaped lens portions, and each linear band-shaped lens portion is formed to be concave in a longitudinal direction thereof and convex in a direction orthogonal to the longitudinal direction.

The method of the present invention for manufacturing a Fresnel lens, particularly the abovementioned toric Fresnel lens, is characterized by fabricating a toroidal body having an inner circumferential surface bulging in arcuate fashion on an inner side, cutting a plurality of substantially rectangular pieces, which include the inner circumferential surface, from the toroidal body, fabricating a mold or master by combining these plurality of pieces, and molding a toric Fresnel lens using the abovementioned mold or a mold obtained from the abovementioned master.

Since the Fresnel lens according to the present invention has the toric Fresnel lens portion, it is well suited for use in the light-projecting optical system or light-receiving optical system of the above-described reflective-type photoelectric switch. Since the thickness of the Fresnel lens can be reduced in this case, the photoelectric switch can be miniaturized. Furthermore, it is possible for the Fresnel lens to be furnished at low cost by the abovementioned method of manufacture since the mold can be fabricated comparatively easily.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3a through 3c are for describing the light-receiving lens of FIG. 2 as well as the action thereof, in which FIG. 3a is a front view, FIG. 3b a sectional view taken along line IIIb—IIIb of FIG. 3a, and FIG. 3c a sectional view taken along line IIIc—IIIc of FIG. 3a;

FIGS. 4a through 4c illustrate another example of a light-receiving lens, in which FIG. 4a is a front view, FIG. 4b a sectional view taken along line IVb—IVb of FIG. 4a, and FIG. 4c a sectional view taken along line IVc—IVc of FIG. 4a;

FIGS. 5a through 5c showing an example in which a light-receiving lens is constructed by a Fresnel lens, in which FIG. 5a is a front view, FIG. 5b a sectional view taken along line Vb—Vb of FIG. 5a, and FIG. 5c a sectional view taken along line Vc—Vc of FIG. 5a;

FIGS. 6a through 6d illustrate another example of a reflective-type photoelectric switch as well as a light-receiving reflector employed by this reflective-type photoelectric switch, in which FIG. 6a is a front view of the light-receiving reflector, FIG. 6b a sectional view taken along line VIb—VIb of FIG. 6a, FIG. 6c a sectional view taken along line VIc—VIc of FIG. 6a, and FIG. 6d a partially cut-away side view of the reflective-type photoelectric switch;

FIGS. 8a through 11c illustrate various shapes of light-receiving lenses, in which:

FIG. 8a is a front view, FIG. 8b a sectional view taken along line VIIIb—VIIIb of FIG. 8a, and FIG. 8c a sectional view taken along line VIIIc—VIIIc of FIG. 8a;

FIG. 9a is a front view, FIG. 9b a sectional view taken along line IVb—IVb of FIG. 9a, and FIG. 9c a sectional view taken along line IVc—IVc of FIG. 9a;

FIG. 10a is a front view, FIG. 10b a sectional view taken along line Xb—Xb of FIG. 10a, and FIG. 10c a sectional view taken along line Xc—Xc of FIG. 10a; and FIG. 11a is a front view, FIG. 11b a sectional view taken along line XIb—XIb of FIG. 11a, and FIG. 11c a sectional view taken along line XIc—XIc of FIG. 11a;

FIGS. 15a through 15d illustrate another example in which a light-projecting lens and a light-receiving lens are constituted by Fresnel lenses, in which FIG. 15a is a front view, FIG. 15b a sectional view taken along line XVb—XVb of FIG. 15a, FIG. 15c a sectional view taken along line XVc—XVc of FIG. 15a, and FIG. 15d a sectional view taken along line XVd—XVd of FIG. 15a;

FIGS. 16a through 16c illustrate a further example in which a light-projecting lens and a light-receiving lens are constituted by Fresnel lenses, in which FIG. 16a is a front view, FIG. 16b a sectional view taken along line XVIb—XVIb of FIG. 16a, and FIG. 16c a sectional view taken along line XVIc—XVI;

FIGS. 17a through 18b illustrate a process for fabricating a mold that is for forming a toric Fresnel lens in the light receiving lens of FIGS. 15a through 15d, in which:

FIG. 17a is a front view of a toroidal body and FIG. 17b a sectional view taken along line XVIIb—XVIIb of FIG. 17a; and FIG. 18a is a front view showing, in the assembled state, pieces that have been cut from the toroidal body, and FIG. 18b a sectional view taken along line IIXXb—IIXXb of FIG. 18a;

FIGS. 20a through 22c illustrate still other examples of light-receiving lenses, in which:

FIG. 20a is a front view, FIG. 20b a sectional view taken along line XXb—XXb of FIG. 20a, and FIG. 20c a sectional view taken along line XXc—XXc of FIG. 20a;

FIG. 21a is a front view, FIG. 21b a sectional view taken along line XXIb—XXIb of FIG. 21a, and FIG. 21c a sectional view taken along line XXIc—XXIc of FIG. 21a; and FIG. 22a is a front view, FIG. 22b a sectional view taken along line XXIIb—XXIIb of FIG. 22a, and FIG. 22c a sectional view taken along line XXIIc—XXIIc of FIG. 22a;

DESCRIPTION OF THE PREFERRED EMBODIMENTS

Figure 1:
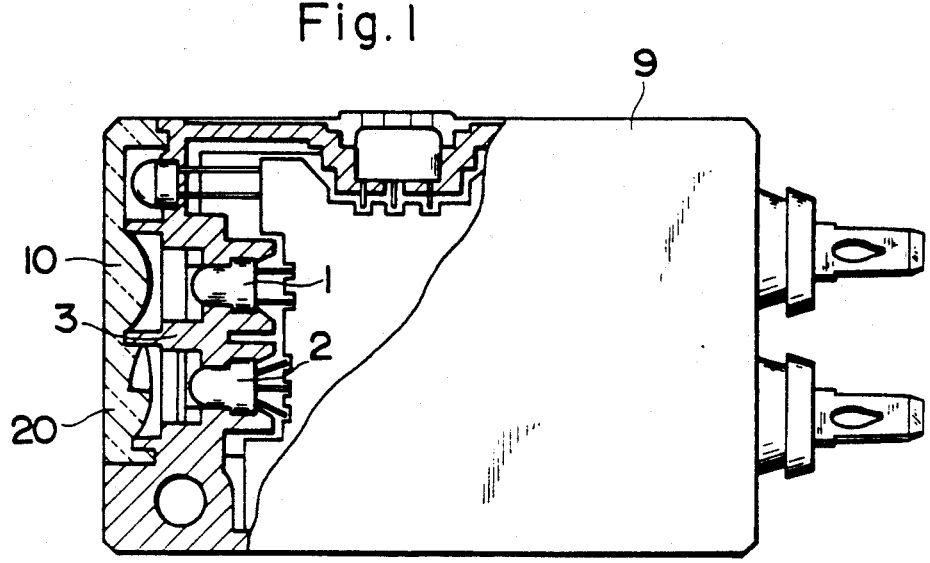
FIG. 1 is a partially cut-away side view illustrating an embodiment of a reflective-type photoelectric switch according to the present invention.
Figure 2:
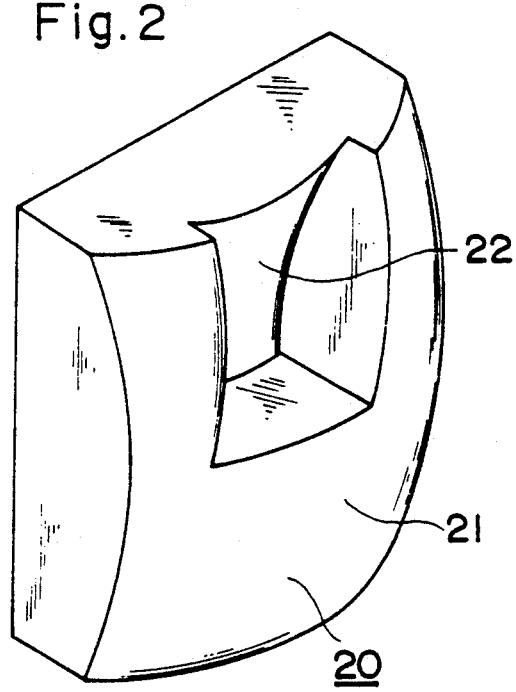
FIG. 2 is a perspective view illustrating an example of a light-receiving lens.

FIG. 1 illustrates an embodiment of a reflective-type photoelectric switch according to the present invention. The reflective-type photoelectric switch includes, in a case 9 thereof, a light-emitting element 1 such as a light emitting diode or semiconductor laser, a light-projecting lens 10 for collimating (or condensing) emitted light from the light-emitting element 1 and projecting the collimated (condensed) light toward a detection zone, a light-receiving lens 20 for condensing reflected light from an object to be detected located in the detection zone, and a light-receiving element 2, such as a photodiode or phototransistor, for receiving the light condensed by the light-receiving lens 20 and outputting a received-light signal, with the switch being adapted to output a signal, indicative of detection of the object, based on the output signal of the light-receiving element 2. The light-emitting element 1 and light-receiving element 2 are optically shielded from each other by a barrier 3. The light-projecting lens 10 and light-receiving lens 20 are formed as a unitary body. The light-projecting lens 10 is constituted by an ordinary convex lens. The light-receiving lens 20 possesses a special shape, the details of which are illustrated in FIG. 2 and FIGS. 3a through 3c separately of the light-projecting lens 10. In FIG. 3c, the light-emitting element 1 and the light-projecting lens 10 are indicated by the phantom lines in order to show the positional relationship between the light-receiving element 2 and the light-receiving lens 20 and the light-emitting element 1 and the light-projecting lens 10.

The light-receiving lens 20 is a convex lens overall, with the convex lens portion being indicated at numeral 21. The light-receiving lens 20 is formed to have a recess portion in a part thereof, and the bottom of the recess portion is formed into a toric surface 22. The toric surface 22 is situated at a portion close to the light-projecting lens 10 (see FIG. 1 and FIG. 3c).

An optic axis M1 of the light-emitting element 1 and optic axis M2 of the light-receiving element 2 are parallel. The toric surface 22 of the light-receiving lens 20 is formed into a shape presenting a concave section in a plane (hereinafter referred to as a first plane) containing the optic axes M1, M2, and a convex section in a plane (hereinafter referred to as a second plane) orthogonal to the plane containing the optic axes M1, M2 and parallel to the optic axes M1, M2. Accordingly, the toric surface 22 acts to diverge incident light in the first plane (see FIG. 3c) and condenses the incident light in the second plane (see FIG. 3b). Preferably, the radius of curvature of the convex section of the toric surface 22 that appears in the second plane is smaller than that of the convex lens portion 21. (In other words, the focal distance of the convex section should be shorter.)

In the reflective-type photoelectric switch having the light-receiving lens 20 of this kind, the light-emitted by the light-emitting element 1 is projected upon being collimated or condensed by the light-projecting lens 10. If an object to be detected is present in a detection zone defined by the projected light, the projected light is diffusely reflected by the object. Some of the reflected light passes through the light-receiving lens 20 and is guided to the light-receiving element 2 in the following manner:

In a case where the object to be detected is far, the reflected light from the object can be considered to be substantially parallel to the optic axis M2. In such case, the reflected light is mainly condensed by the convex lens portion 21 of the light-receiving lens 20 to be guided to the light-receiving surface of the light-receiving element 2, as indicated by the broken lines in FIGS. 3b and 3c. Naturally, some light is introduced to the light-receiving element 2 through the toric surface 22, though the amount is very small.

In a case where the object to be detected is at distance very close to the front of the light-projecting lens 10, the reflected light from the object is obliquely incident upon the light-receiving lens 20 in the first place (see FIG. 3c). The light obliquely incident upon the toric surface 22 is diverged in the first plane and some of the diverged light reaches the light-receiving surface of the light-receiving element 2, where the light is received. In the second plane (see FIG. 3b), the incident light is condensed by the toric surface 22, and in the first plane much of the light having an optical path capable of reaching the light-receiving surface of the light-receiving element 2 is assuredly incident upon the light-receiving element 2. It goes without saying that light incident upon the light-receiving element 2 through the convex lens portion 21 also exists, though the amount is very small.

Thus, regardless of whether the object to be detected is at a long distance or a very short distance, the reflected light from the object will impinge upon the light-receiving element 2 to make possible sure detection of the object. The solid curve shown at character C in FIG. 7 indicates the light-receiving characteristic in the reflective-type photoelectric switch having the above-described light-receiving lens 20. As will be understood from the curve C, the received light output exhibits a considerably high level at very short distances, and there is no blind zone at these very short distances. Detection of the object is possible regardless of whether the position of the object to be detected is near or far.

In a specific example, it is possible to adopt a design in which mainly the toric surface 22 is capable of guiding light to the light-receiving element that is reflected from an object located at a very short distance of 10 mm or less to a short distance of 100 mm, and in which mainly the convex lens portion 21 is capable of condensing reflected light from an object located at distances ranging from a short distance of 50 mm to infinity so that this light can be guided to the light-receiving element.

In the foregoing embodiment, the light-receiving lens is formed to have the toric surface. However, it is permissible to form the toric surface at a portion of the light-projecting lens on the side near the light-receiving lens. In this case, a convex lens can be used as the light-receiving lens, or a lens formed to have a toric surface can be used as the light receiving lens.

In a case where the toric surface is formed on the light-projecting lens, a portion of the light emitted from the light-emitting element is collimated or condensed by the convex lens portion of the light-projecting lens, and this light is projected to reach a long distance. The other portion of the light is diverged in the first plane and condensed in the second plane by the toric surface, thereby illuminating distances ranging from very short to short, particularly the region near the light-receiving lens. As a result, the arrangement is such that reflected light from an object present not only at long distances but also at very short distances will be received by the light-receiving element. Since the projected light which illuminates the very short distances is condensed in the second plane, the intensity of the projected light also is comparatively high and the detection zone is limited to a comparatively narrow range.

Though only the light-receiving lens will be described in detail in other embodiments or modifications indicated hereinbelow, it goes without saying that these other embodiments or modifications are applicable to the light-projecting lens as well.

FIGS. 4a through 4c illustrate another embodiment of the light-receiving lens. In the light-receiving lens shown in FIG. 2 and FIGS. 3a through 3c, the toric surface is formed only in part (the central part) of the lens in terms of the width direction thereof. In a light-receiving lens 30 shown in FIGS. 4a through 4c, a toric surface 32 is formed in the entire surface (over the entire width) of half of the lens (the upper half in FIGS. 4a and 4c). The lower half of the light-receiving lens 30 is an ordinary convex lens 31. The surface of the convex lens 31 and the toric surface 32 are connected in continuous fashion.

As in the manner of the above-described light-receiving lens 20, this light-receiving lens 30 also diverges the light, which is incident upon the portion of the toric surface 32, in the first plane, and condenses this incident light in the second plane.

In both of the foregoing embodiments, a bulk lens is illustrated as the light-receiving lens. FIGS. 5a through 5c show an example in which the light-receiving lens is constituted by a refracting-type Fresnel lens. Here a light-receiving Fresnel lens 40 includes a toric Fresnel lens formed on a portion of a Fresnel lens 41 which performs a light-condensing action. The Fresnel lenses 41, 42 of this embodiment both comprise a plurality of annular band-shaped lens portions. As in the embodiment of FIG. 2 and FIGS. 3a through 3c, the toric Fresnel lens 42 is provided solely in a portion (the central portion) of the Fresnel lens 40 in terms of the width direction thereof at a part of the lens on the side near the light-projecting lens. This toric Fresnel lens 42 also diverges incident light in the first plane and condenses the incident line in the second plane.

By constructing the light-receiving lens of a Fresnel lens, lens thickness can be reduced and the light-receiving optical system can be miniaturized.

Figure 6D:
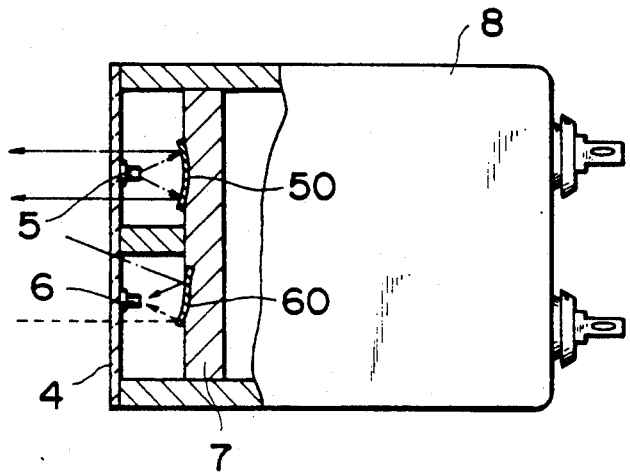

FIGS. 6a through 6d illustrate another embodiment of a reflective-type photoelectric switch. The overall construction of the reflective-type photoelectric switch is depicted in FIG. 6d. A light-emitting element 5 and a light-receiving element 6 are fixedly attached to a transparent plate 4 provided on the front side of a case 8 of the reflective-type photoelectric switch. Provided within the case 8 is a support member 7, as well as a light-projecting reflector 50 and a light-receiving reflector 60 provided on the support member at positions corresponding to the light emitting element 5 and light-receiving element 6, respectively. The light-projecting reflector 50 is an ordinary concave mirror which, by reflecting emitted light from the light-emitting element 5, collimates (or, in some cases, condenses) the light to project a light beam out through the transparent plane 4.

Figure 6B:
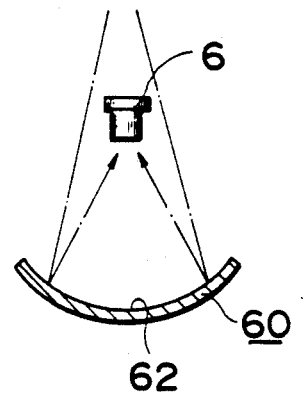
Figure 6C:
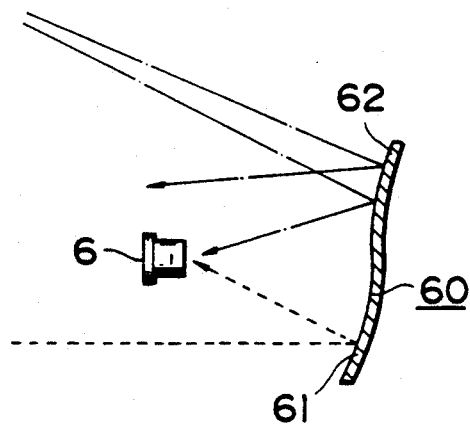
Figure 6A:
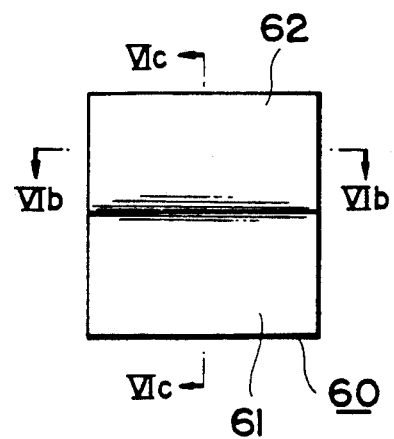

The light-receiving reflector 60 possesses a somewhat complicated shape, the details of which are show in FIGS. 6a through 6c. The light-receiving reflector 60 comprises a concave mirror portion 61 and a toric surface reflector portion 62, which are continuously connected substantially at the central portion of the reflector 60. The toric surface reflector portion 62 is situated on the side of the light-projecting reflector 50.

Figure 7:
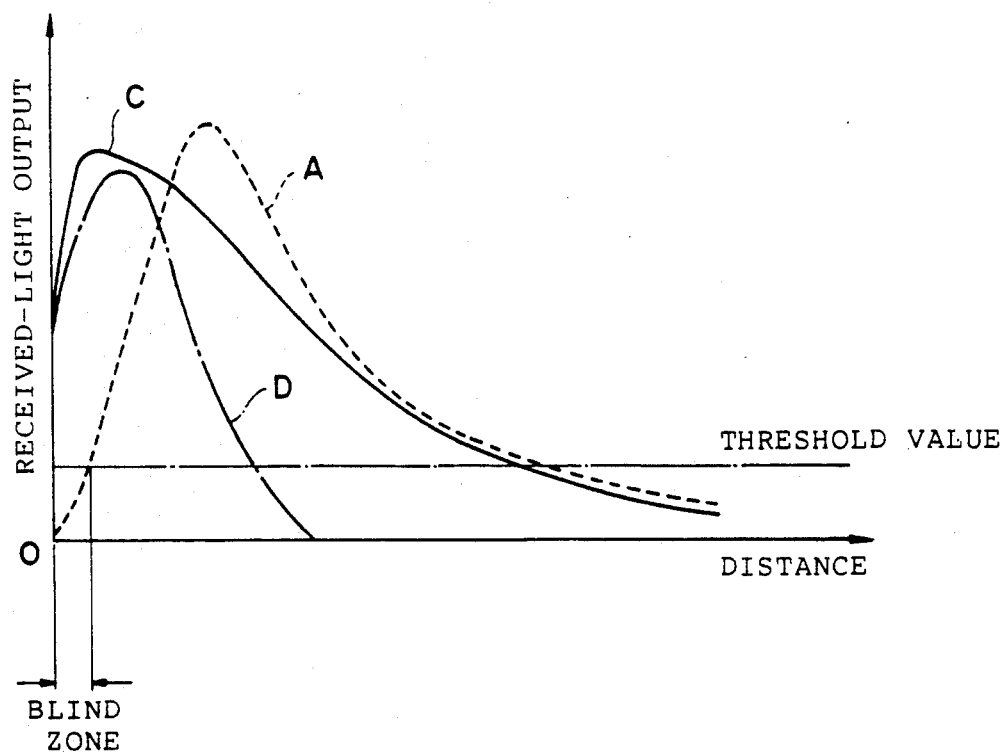
FIG. 7 is a graph illustrating the light-receiving characteristic of the reflective-type photoelectric switch of the present invention in comparison with that of an example of the prior art.

The concave mirror portion 61 mainly condenses reflected light (indicated by the broken line in FIG. 6c) from a distant object to be detected, which light impinges upon the mirror portion while being substantially parallel to the optic axis of the light-receiving element 6. The condensed light is introduced to the light-receiving surface of the light-receiving element 6. The toric surface reflector 62 possesses a convex cross section (see FIG. 6c) in the first plane and a concave cross section in the second plane (see FIG. 6b). Accordingly, when reflected light from an object at a very short distance is incident upon the toric surface reflector 62, the incident light mainly diverges as seen from the first plane, and a portion of this light impinges upon the light-receiving element 6. In the second plane, incident light having a path along which the light impinges upon the light-receiving element 6 as viewed from the first plane is condensed by the toric surface reflector 62 and the condensed light impinges upon the light-receiving element 6. In this case also a light-receiving characteristic of the kind shown at C in FIG. 7 is obtained.

Optimizing the shape of the light-receiving lens will now be considered with reference to FIGS. 8a through 14. The light-receiving lens of the type illustrated in FIGS. 4a through 4c will be taken as an example.

FIGS. 8a through 8c depict the manner in which the light-receiving lens 30 is formed unitarily with the light-projecting lens 10. Though the toric surface 32 of the light-receiving lens 30 and the surface of the convex lens portion 31 are continuous, the boundary between these surfaces is indicated by a solid line in FIG. 8a in order to make the boundary easy to see. The portion of the toric surface 32 and the convex lens portion 31 are contiguous to the boundary at an intermediate position vertically of the lens 30 in FIG. 8a. The toric surface 32 is located at the upper portion in FIG. 8a, namely on the side near the light-projecting lens 10.

With reference particularly to the longitudinal section view of FIG. 8c, the center $O_1$ of curvature of the convex surface of the convex lens portion 32 in the light-receiving lens 30 is situated on the center line of the light-receiving lens 30. The center $O_2$ of curvature of the curve forming the concave surface of the toric surface 32 also is situated on the abovementioned center line. This center line coincides with the optic axis M2 of the light-receiving element 2, as will be described later.

The toric surface 32 occupies the upper half portion in the light-receiving lens 30 shown in FIGS. 9a through 9c as well. As will be understood from a comparison between FIGS. 9c and 8c, the center $O_2$ of curvature of the curve defining the concave shape of the toric surface 32 is situated on the side of the light-projecting lens 10 with respect to the center line (the center $O_1$ of curvature of the convex lens portion 31 is on the center line).

In the light-receiving lens 30 shown in FIGS. 10a through 10c, the center $O_2$ of curvature of the curve defining the concave shape of the toric surface 32 is located even closer to the side of the light-projecting lens 10. In addition, the size of the toric surface 32 is smaller.

In the light-receiving lens 30 shown in FIGS. 11a through 11c, the center $O_2$ of curvature of the curve defining the concave shape of the toric surface 32 is located below the abovementioned center line, i.e., at a position farther from the light-projecting lens 10 than the center line. The size of the toric surface is approximately half that of the light-receiving lens.

Figure 12:
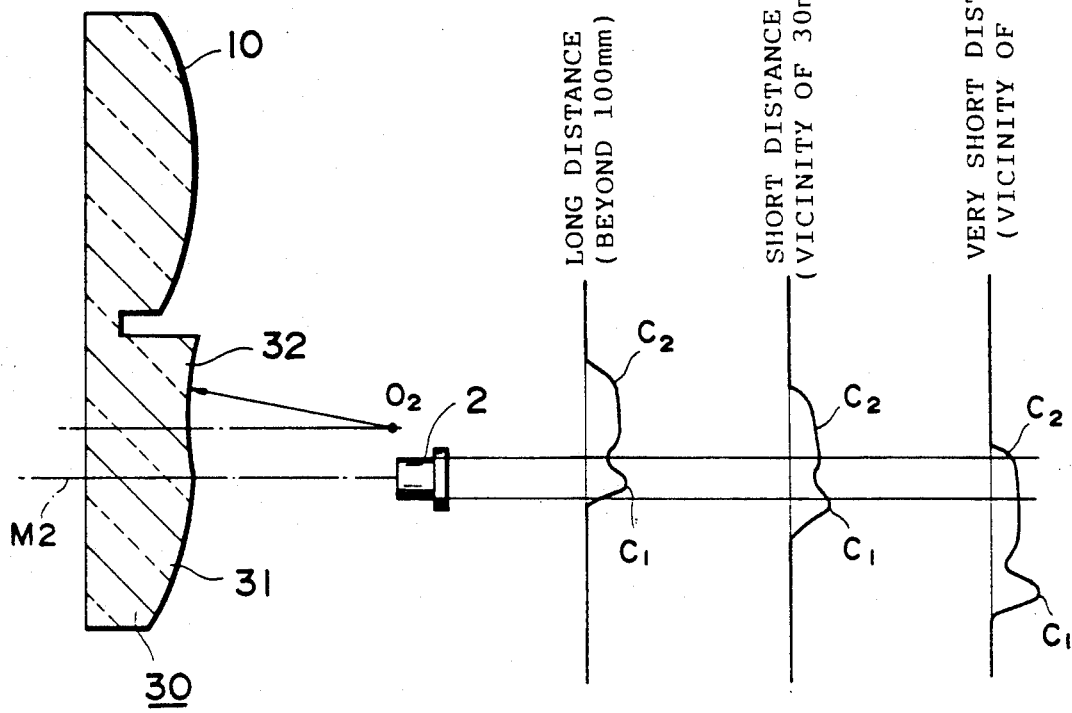
FIG. 12 illustrates the light-receiving lens of FIGS. 9a through 9c as well as light-quantity distributions on the light receiving surface of a light-receiving element.
Figure 13:
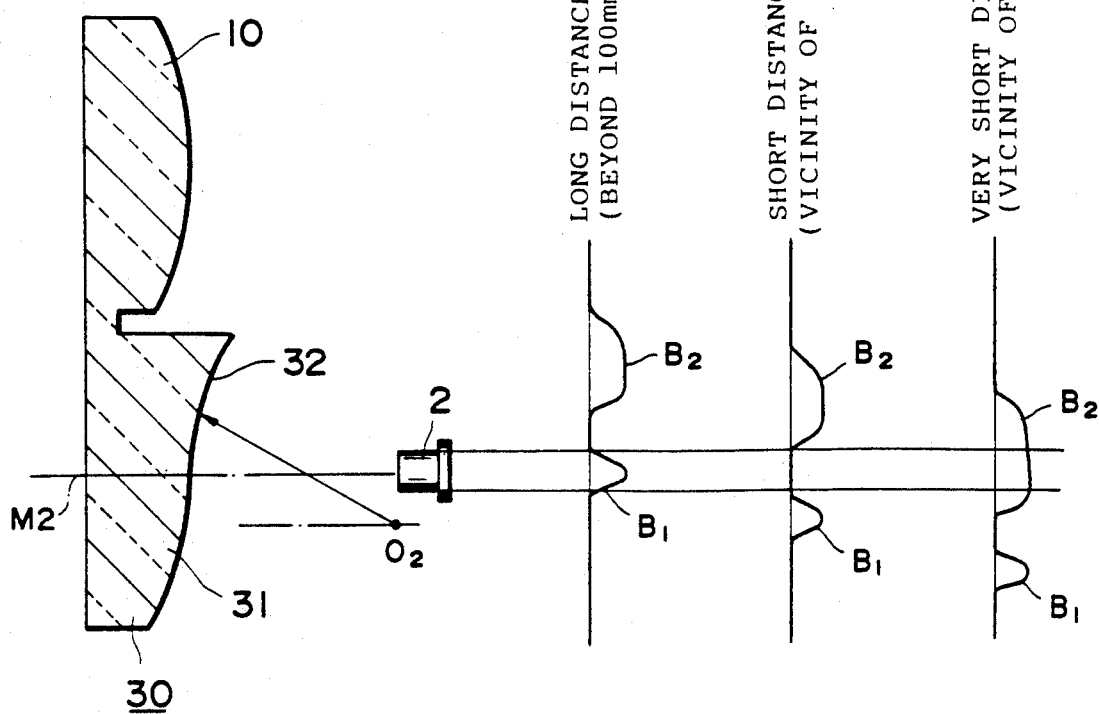
FIG. 13 illustrates the light-receiving lens of FIGS. 11a through 11c as well as light-quantity distributions on the light-receiving surface of a light-receiving element.
Figure 14:
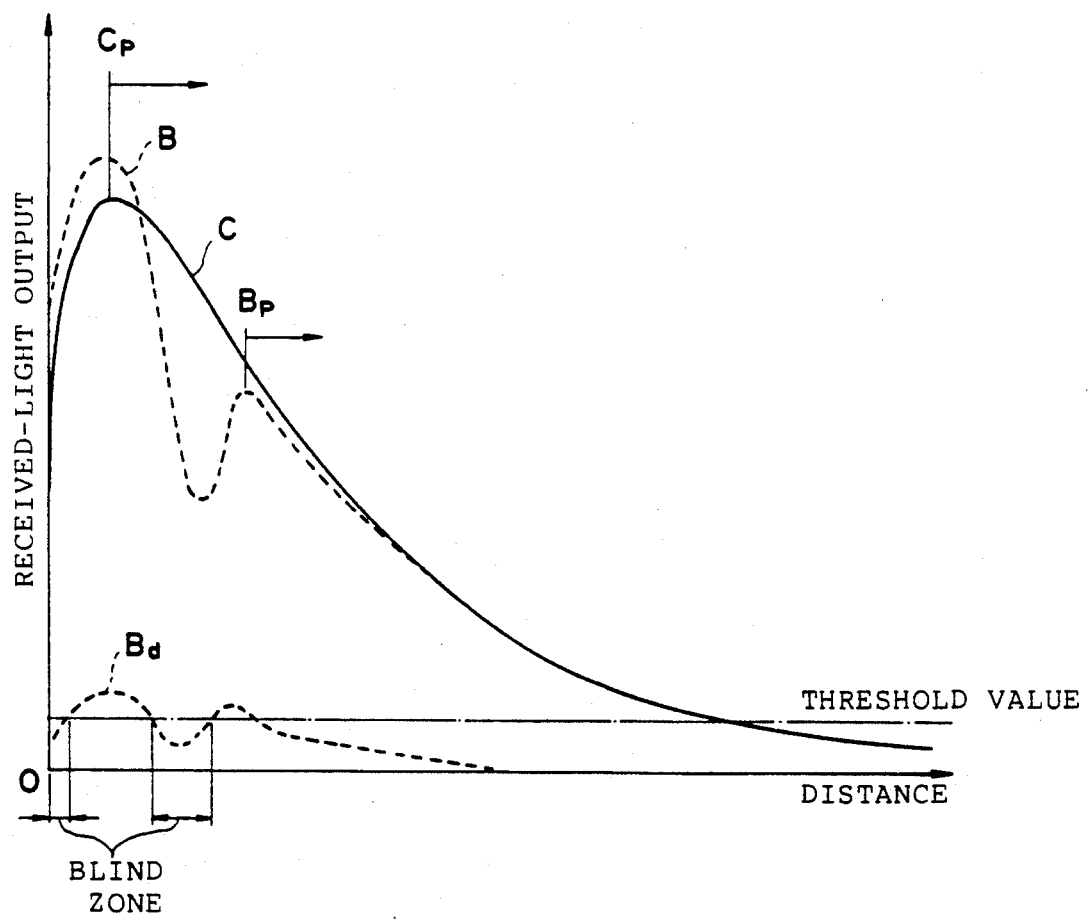
FIG. 14 is a graph illustrating the light-receiving characteristics of the light-receiving lenses shown in FIGS. 12 and 13.
Figure 15B:
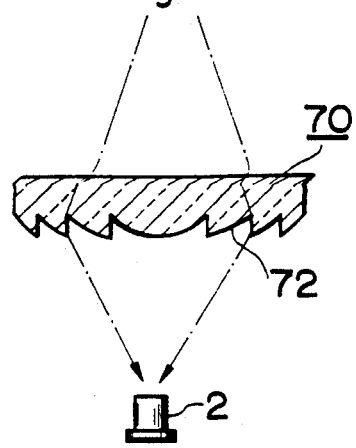
Figure 15C:
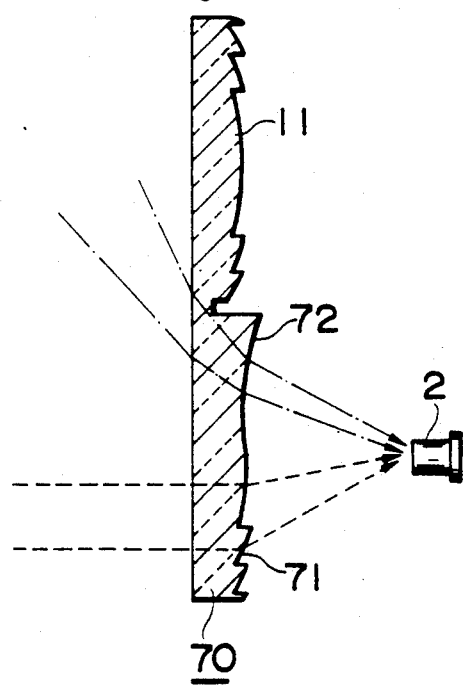
Figure 15A:
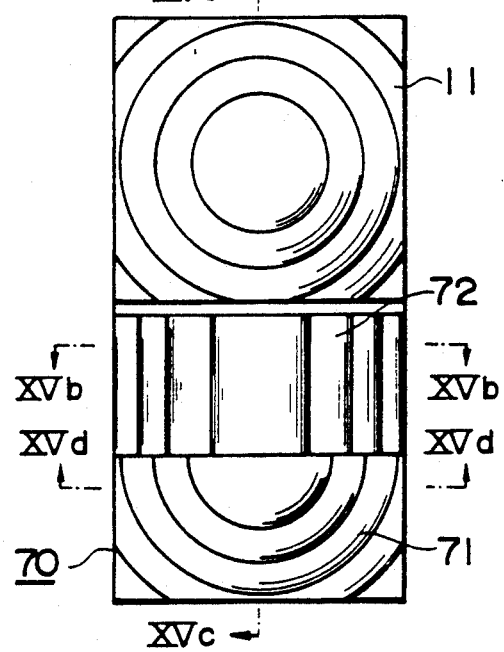
Figure 15D:
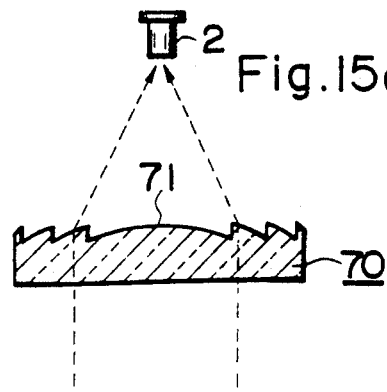

The optical properties of the abovementioned toric surfaces having various shapes will now be considered with reference to FIGS. 12 through 14.

FIG. 12 illustrates the light-receiving lens shown in FIGS. 9a through 9c, and FIG. 13 illustrates the light-receiving lens shown in FIGS. 11a through 11c. In FIGS. 12 and 13, the light-receiving element 2 is disposed on the center line of the light-receiving lens 30. The graphs shown on the right side of FIGS. 12 and 13 illustrate incident light quantity distributions in a plane containing the light-receiving surface of the light-receiving element 2 and orthogonal to the optic axis M2 thereof (the center line of the light-receiving lens). The curves of these light-quantity distributions appear in the longitudinal cross section. The graphs illustrated are of three types, namely for cases in which the object to be detected is at a long distance (100 mm or more), a short distance (in the vicinity of 30 mm) and a very short distance (in the vicinity of 10 mm), respectively.

As shown in FIG. 12, when the center $O_2$ of curvature of the curve defining the concave surface of the toric surface 32 is closer to the light-projecting lens 10 than the center line of the light-receiving lens 30, the light-quantity distribution $C_2$ of the light incident through the toric surface 32 and the light-quantity distribution $C_1$ of the light condensed by the convex lens portion 31 overlap in all cases, namely at the long, short and very short distances. Hence, the distributions $C_1$ and $C_2$ are continuous. Accordingly, reflected light from the object to be detected can be received by the light-receiving element 2 regardless of the distance of the object. Consequently, the light-receiving characteristic indicated by C in FIG. 14 is obtained, as mentioned earlier.

By contrast, when the center $O_2$ of curvature of the curve defining the concave surface of the toric surface 32 is at a position farther from the light-projecting lens 10 than the center line of the light-receiving lens 30, the light-quantity distribution $B_2$ of the light incident through the toric surface 32 and the light-quantity distribution $B_1$ of the light condensed by the convex lens portion 31 separate from each other. As a result, the valley between the light-quantity distributions $B_1$ and $B_2$ coincides with the position of the light-receiving element 2, and hence the quantity of light incident upon the light-receiving element 2 is diminished, particularly at short distances in the vicinity of 30 mm. Accordingly, the light-receiving characteristic obtained is one in which the received-light output declines at short distances as indicated by the broken line B in FIG. 14.

The light-receiving characteristic indicated by the broken line B involves the following problems in terms of practical use: Specifically, if the sensitivity of the reflective-type photoelectric element having the light-receiving characteristic indicated by the broken curve B is lowered in order that the switch may be used for very short distances, the light-receiving characteristic becomes as indicated by the broken curve Bd. As a result, the received-light output falls below the threshold value and a blind zone is produced at very short and short distances. One more problem arises in a case where an analog output conforming to the distance of the object to be detected is required. With the light-receiving characteristic of broken curve B or Bd, it is possible for two distances to exist with respect to one level of the received-light output, particularly in the vicinity of short distances. Distance cannot be uniquely determined from the level of the received-light output. The range over which distance can be uniquely determined from the level of the received-light output is beyond the distance Cp in the case of curve C, whereas the range is beyond the position Bp, which is farther than Cp, in the case of curve B. Thus, according to the characteristic expressed by curve B, the range over which distance can be uniquely determined from the level of the received light output is narrowed.

To sum up the foregoing, when the center $O_2$ of curvature of the curve defining the concave surface of the toric surface 32 is located between the position of the curvature center $O_1$ of the convex lens portion 31 of light-receiving lens 32 and the position of that end of the light-receiving lens 30 adjacent the light-projecting lens 10 (FIGS. 8a through 10c), a nearly ideal light-receiving characteristic is obtained, as in the manner of the curve indicated at C in FIG. 14. With this light-receiving characteristic C, a blind zone will not develop at any sensitivity setting over distances ranging from very short to long. In addition, the received-light output decreases monotonously with an increase in distance at distances beyond the position Cp. As a result, the user is capable of adjusting sensitivity based on natural sensation without a sense of incompatibility. If an analog signal possessing a level conforming to distance is required, a received-light output uniquely corresponding to distance can be obtained over a wide range of distances.

It goes without saying that the abovementioned approach for obtaining the nearly ideal light-receiving characteristic C is applicable also to an arrangement in which the light-receiving lens is constituted by a Fresnel lens and to a light-receiving reflector as well.

Yet another example in which the light-projecting lens and light-receiving lens are constituted by a refracting-type Fresnel lens will be described with reference to FIGS. 15a through 15d.

In these Figures, a light-projecting lens 11 comprises an ordinary convex lens-type Fresnel lens having a plurality of annular band-shaped lens portions. A light-receiving lens 70 comprises an ordinary convex-type Fresnel lens 71, which is a lower half, and a toric Fresnel lens 72, which is an upper half. The convex-type Fresnel lens 71 is the same as that which would be obtained by cutting the light-projecting Fresnel lens 11 in half. The toric Fresnel lens 72 is constituted by a plurality of linear band-shaped lens portions. These linear band-shaped lens portions extend parallel to the first plane and act to diverge incident light in first plane and condense incident light in the second plane. In other words, the cross section which appears in the first plane has the shape of a concave lens (see FIG. 15c), and the cross section that appears in the second plane has the shape of a convex lens-type Fresnel lens.

It goes without saying that a light-receiving characteristic of the kind indicated at curve C in FIG. 7 or 14 is obtained even when a light-receiving lens composed of such a Fresnel lens is employed.

Figure 16B:
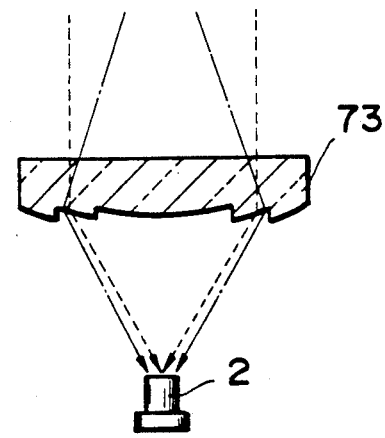
Figure 16C:
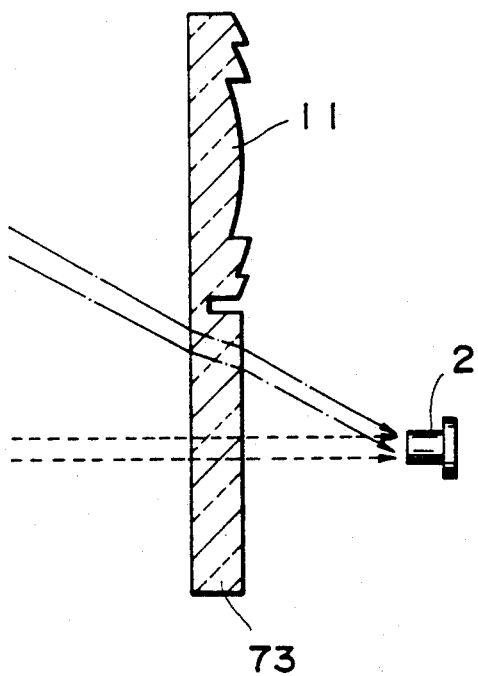
Figure 16A:
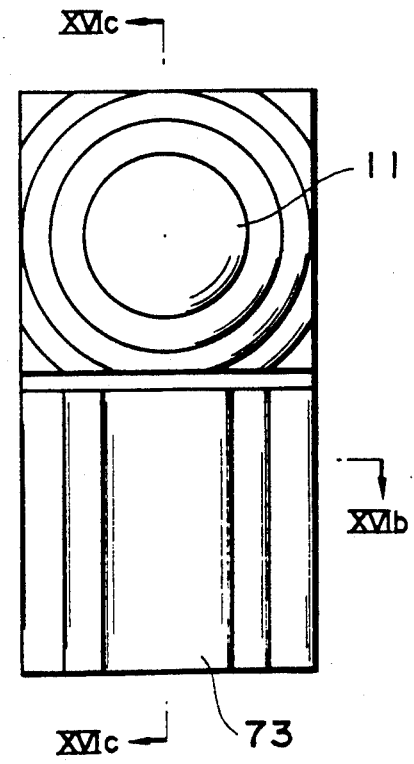

A further example is illustrated in FIGS. 16a through 16c. Here the entirety of a light-receiving lens 73 is constituted by a cylindrical Fresnel lens. When the light-receiving lens 73 of this type is used, reflected light from the object to be detected is merely condensed in the second plane. In the first plane, reflected light (indicated by the broken lines) from an object to be detected at a long distance merely passes through the lens 73, and reflected light (indicated by the chain lines) from an object to be detected at a very short distance is merely refracted. Accordingly, the received light output level of reflected light especially from an object at a long distance is low, as a result of which the light-receiving characteristic is expressed by the curve indicated at D in FIG. 7. Such a light-receiving lens can be used effectively in a reflective-type photoelectric switch for detecting only objects at very short distances.

A light-projecting lens and light-receiving lens utilizing the Fresnel lenses shown in FIGS. 15a through 16c are advantageous in that lens thickness can be made small to enable a reduction in the size of the photoelectric switch. Moreover, in comparison with the arrangement having the annular band-shaped lens portions of the kind shown in FIGS. 5a through 5c, the Fresnel lenses 72, 73 having the linear band-shaped lens portions are characterized in that the molds for producing them are easier to fabricate.

FIGS. 17a through 18b illustrate a procedure for fabricating a mold used to mold the toric Fresnel lens 72 shown in FIGS. 15a through 15d.

Figure 17A:
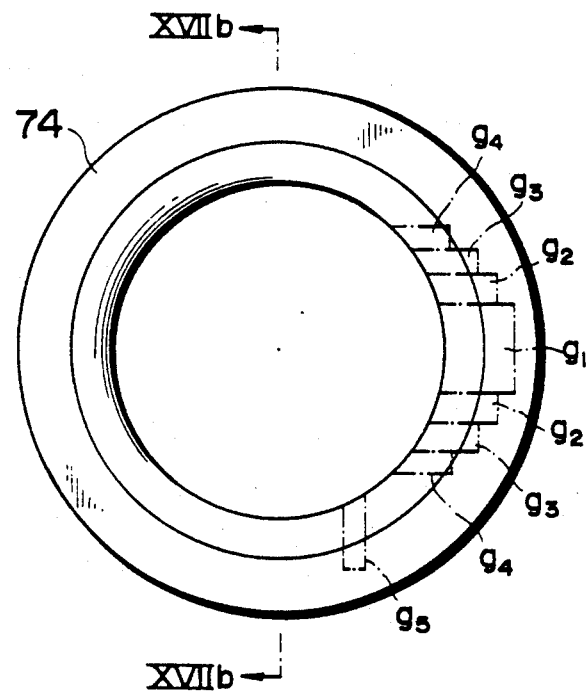
Figure 17B:
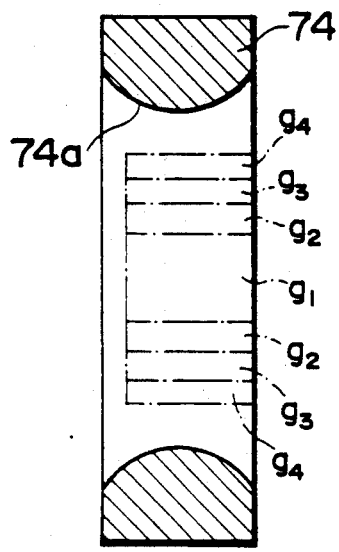

In FIGS. 17a and 17b, first a toroidal body 74 is fabricated using a lathe for machining an aspherical surface lens. An inner circumferential surface 74a of this toroidal body 74 has an inwardly directed arcuate bulge and is machined into an aspherical mirror surface. Pieces $g_1$, $g_2$, $g_3$ and $g_4$ are cut from the toroidal body 74, as indicated by the chain lines. These pieces need not at all be cut out in adjacent fashion as illustrated but can be cut from any location, as indicated at $g_5$.

Figure 18A:
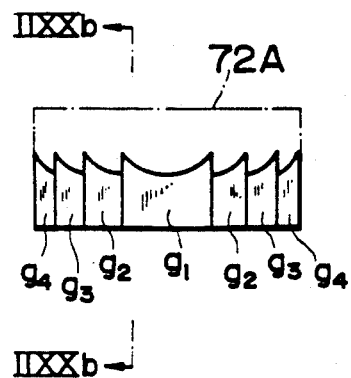

The master of a mold is constructed by combining the cut pieces $g_1$–$g_4$, as illustrated in FIGS. 18a and 8b. The master can be used as part of a mold or transferred to another molding material by electrical discharge machining. In either case, the mold of the toric Fresnel lens would eventually be used upon combining the mold for the portion of the light-projecting Fresnel lens 11 and the mold for the portion of the convex lens-type Fresnel lens 71.

Figure 18B:
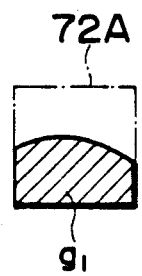

When a mold thus fabricated is used, the toric Fresnel lens molded will have an aspherical surface (concave surface) in the first plane and a spherical surface (convex surface) in the second plane, as indicated by the chain line 72A in FIGS. 18a and 18b. It will suffice to use a method such as injection molding to mold the Fresnel lens.

Figure 19:
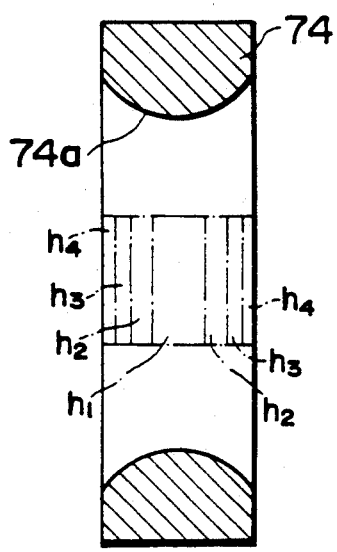
FIG. 19 is a sectional view, corresponding to FIG. 17b, for illustrating another method of cutting out the pieces.

It is also possible to obtain pieces $h_1$–$h_4$ by cutting the toroidal body 74 as shown in FIG. 19, fabricate a master by combining these pieces, and transfer the master to a mold by electrical discharge machining. When this mold is used, the toric Fresnel lens molded will have a spherical surface (concave surface) in the first plane and an aspherical surface (convex surface) in the second plane.

Figure 23:
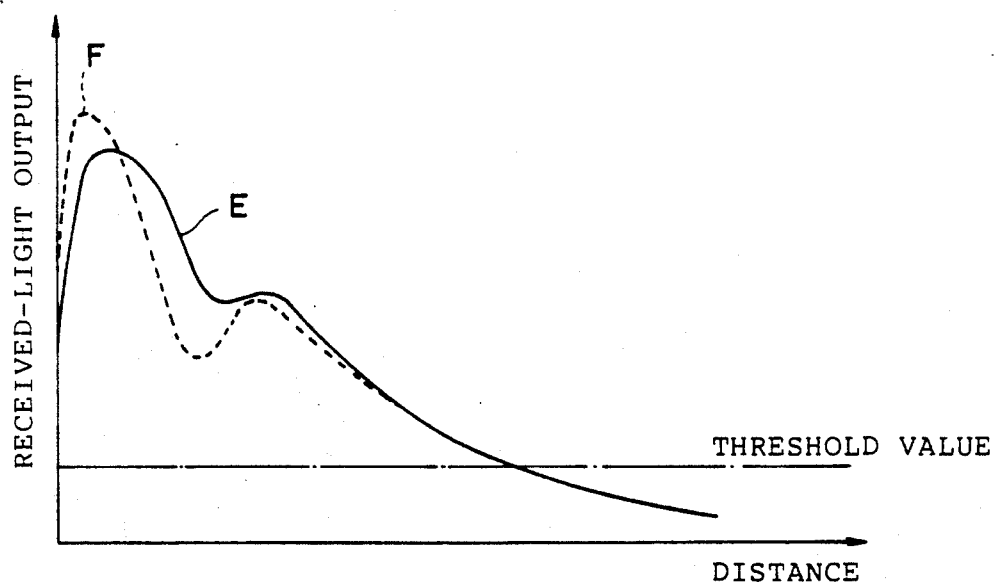
FIG. 23 is a graph showing the light-receiving characteristic of the light-receiving lenses depicted in FIGS. 20a through 21c.
Figure 24:
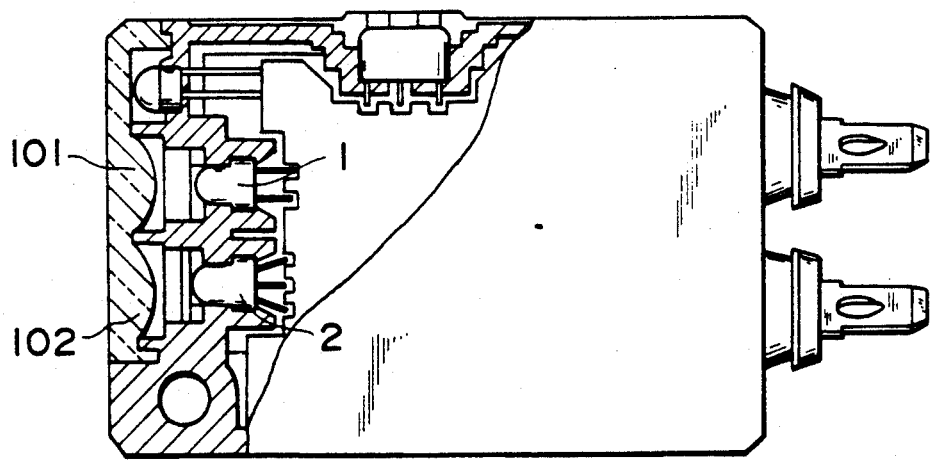
FIG. 24 is a partially cut-away side view showing a reflective-type photoelectric switch according to the prior art.

The mold for the cylindrical Fresnel lens shown in FIGS. 16a through 16c can readily be fabricated by cutting out portions of a cylinder and combining these pieces. FIGS. 20a through 20c illustrates yet another example of a light-receiving lens. The light-receiving lens 80 in these Figures comprises an ordinary convex lens portion 81 and a cylindrical lens portion 82, with the latter being situated on the side of the light-projecting lens 10. The reflected light from an object to be detected at long distance is mainly condensed by the convex lens portion 81 to impinge upon the light-receiving element 2. The reflected light from an object to be detected at a very short distance is refracted in the first plane and condensed in the second plane by the cylindrical lens portion 82 to impinge upon the light-receiving element 2. Accordingly, the light-receiving characteristic of the light-receiving lens 80 is as shown by the solid curve indicated at E in FIG. 23. Though the received-light output declines in the vicinity of very short distances, no practical problems are encountered.

Figure 21B:
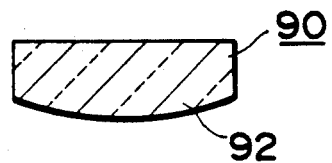
Figure 21C:
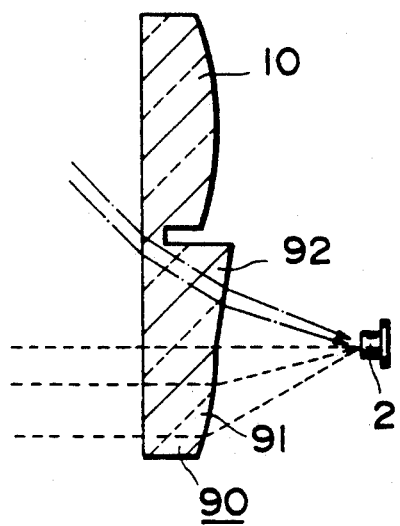
Figure 21A:
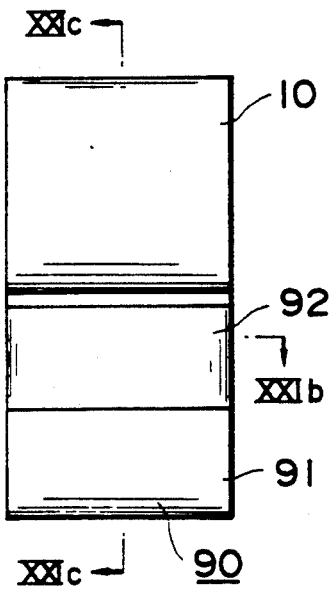

Still another example is illustrated in FIGS. 21a through 21c. A light-receiving lens 90 also comprises an ordinary convex lens portion 91 and a cylindrical lens portion 92, with the latter being situated near the light-projecting lens 10. This lens differs from the light-receiving lens 80 of FIGS. 20a through 20c in that the surface of the cylindrical lens portion 92 is inclined in the first plane (see FIG. 21c) in such a manner that the lens is comparatively thick at the end thereof on the side of the light-projecting lens 10 but diminishes in thickness toward the convex lens portion 92. As a result, the cylindrical lens portion 92 acts in the same manner as a prism in the first plane; hence, reflected light from an object to be detected at very short distance readily impinges upon the light-receiving element 2. Accordingly, there can be obtained a light-receiving characteristic in which the received-light output level at very short distance is raised, as in the manner of the curve expressed by the broken line indicated by F in FIG. 23. The reflected light from an object to be detected at long distance is mainly caused to impinge upon the light-receiving element 2 by the convex lens portion 91, and therefore the light-receiving characteristic at long distance is the same as that for the arrangement shown in FIGS. 20a through 20c. The received light level at short distances drops somewhat also with the light-receiving lens 90.

A light-receiving lens 83 shown in FIGS. 22a through 22c is a cylindrical lens the light-receiving characteristic of which is the same as that of the Fresnel cylindrical lens depicted in FIGS. 16a through 16c. This light receiving characteristic is represented by the curve D in FIG. 7.

The light-receiving lenses 80, 90, 83 shown in FIGS. 20a through 22c have slightly poorer light-receiving characteristics than that of the light-receiving lens 30 shown in FIGS. 4a through 4c, but these lenses are characterized in that they possess a simple shape and are easy to fabricate.

As many apparently widely different embodiments of the present invention can be made without departing from the spirit and scope thereof, it is to be understood that the invention is not limited to the specific embodiments thereof except as defined in the appended claims.

What is claimed is:

1. A reflective-type photoelectric switch comprising:
   a light-emitting element;
   a light-projecting optical system for projecting emitted light from said light-emitting element toward a detection zone;
   a light-receiving element; and
   a light-receiving optical system for guiding reflected light from an object to be detected, which is located in the detection zone, toward said light-receiving element;
   at least one of said light-projecting optical system and said light-receiving optical system including an optical element for diverging light in a direction parallel to a plane which contains an optic axis of said light-emitting element and an optic axis of said light-receiving element, and for condensing light in a direction perpendicular to the same plane, wherein said optical element comprises a lens element having a toric surface formed to include a concave surface in the direction parallel to the plane which contains an optic axis of said light-emitting element and the optic axis of said light-receiving element, and a convex surface in the direction perpendicular to the same plane.

2. The photoelectric switch according to claim 1, wherein when said optical element is included in said light-projecting optical system, said optical element is disposed in said light-projecting optical system near said light-receiving optical system, and when said optical element is included in said light-receiving optical system, said optical element is disposed in said light-receiving optical system near said light-projecting optical system.

3. The photoelectric switch according to claim 1, wherein said light-receiving optical system includes said optical element.

4. The photoelectric switch according to claim 1, wherein said lens element is constituted by a Fresnel lens.

5. The photoelectric switch according to claim 1, wherein said lens element is a Fresnel lens constituted by an assembly of a linear band-shaped lens portions extending in the direction parallel to the plane which contains the optic axis of said light-emitting element and the optic axis of said light-receiving element.

6. The photoelectric switch according to claim 1, wherein one of said light-projecting optical system and said light-receiving optical system comprises a convex lens portion and a toric surface portion provided at a position closer to the other one of said optical systems than said convex lens portion.

7. The photoelectric switch according to claim 6, wherein said toric surface portion has a toric surface formed into a concave shape which diverges incident light in a direction connecting said light-projecting optical system and said light-receiving optical system, and a convex shape which condenses incident light in a direction orthogonal to the abovementioned direction.

8. The photoelectric switch according to claim 6, wherein said convex lens portion and said toric surface portion are both constituted by fresnel lenses.

9. The photoelectric switch according to claim 6, wherein said convex lens portion is a Fresnel lens constituted by a combination of annular lens portions, and said toric surface portion is a Fresnel lens constituted by an assembly of a linear band-shaped lens portions extending in a direction connecting said light-projecting optical system and said light-receiving optical system.

10. The photoelectric switch according to claim 1, wherein at least either of said light-projecting optical system and said light-receiving optical system is constituted by a reflector.

11. The photoelectric switch according to claim 10, wherein said reflector comprises a concave mirror portion and a toric surface mirror portion provided at a position closer to the other of said optical systems than said concave mirror portion.

12. The photoelectric switch according to claim 11, wherein said toric surface mirror portion is formed into a convex mirror shape which diverges light in a direction connecting said light-projecting optical system and said light-receiving optical system, and a concave mirror shape which condenses light in a direction orthogonal to the abovementioned direction.

13. The photoelectric switch according to claim 1, wherein both of said light-projecting optical system and said light-receiving optical system are constituted by reflectors;
    at least one of said reflectors comprises a concave mirror portion and a toric surface mirror portion provided at a position closer to the other of said reflectors than said concave mirror portion; and
    said toric surface mirror portion is formed into a convex mirror shape which diverges light in a direction connecting both of said reflectors, and a concave mirror shape which condenses light in a direction orthogonal to the abovementioned direction.

14. A reflective-type photoelectric switch comprising:
    a light-emitting element;
    a light-projecting lens for projecting emitted light from said light-emitting element toward a detection zone;
    a light-receiving element; and
    a light-receiving lens for guiding reflected light from an object to be detected, which is located in the detection zone, toward said light-receiving element;
    said light-projecting lens being constituted by a convex lens;
    said light-receiving lens being constituted by a convex lens portion and a toric surface portion provided at a position closer to said light-projecting lens than said convex lens portion; and
    said toric surface portion being formed into a concave shape which diverges incident light in a direction connecting said light-projecting lens and said light-receiving lens, and a convex shape which condenses incident light in a direction orthogonal to the abovementioned direction.

15. The photoelectric switch according to claim 14, wherein a center of curvature of a curve defining a concave surface of said toric surface portion is set in a range between a position corresponding to a center of curvature of a curve defining said convex lens portion and a position corresponding to an end of said toric surface portion that is near said light-projecting lens, and a received-light output decreases monotonously from a very short distance to a long distance in a light-receiving characteristic obtained using said light-receiving lens.

16. The photoelectric switch according to claim 14, wherein said convex lens portion and toric surface portion of said light-receiving lens are both constituted by Fresnel lenses.

17. A fresnel lens comprising a convex lens-type Fresnel lens portion and a toric Fresnel lens portion;
    said toric Fresnel lens portion being constituted by a combination of a plurality of linear band-shaped lens portions;
    each of said linear band-shaped lens portions being formed into a concave shape in a longitudinal direction thereof and a convex shape in a direction orthogonal to the longitudinal direction.

18. A toric Fresnel lens comprising a combination of a plurality of linear band-shaped lens portions, each of said linear band-shaped lens portions being formed into a concave shape in a longitudinal direction thereof and a convex shape in a direction orthogonal to the longitudinal direction.

19. A method of manufacturing a toric Fresnel lens comprising the steps of:
    fabricating a toroidal body including an inner circumferential surface having an inwardly directed arcuate bulge;
    cutting a plurality of substantially rectangular pieces, each of which includes said inner circumferential surface, from said toroidal body;
    fabricating a mold or a master thereof by combining said plurality of pieces; and
    molding a toric Fresnel lens using said mold or a mold obtained from said master.

20. A reflective-type photoelectric switch comprising:
    a light-emitting element;
    a light-projecting lens for projecting emitted light from said light-emitting element toward a detection zone;
    a light-receiving element; and
    a light-receiving lens for guiding reflected light from an object to be detected, which is located in the detection zone, toward said light-receiving element;
    at least either of said light-projecting lens or said light-receiving lens being constituted by a convex lens portion and a cylindrical lens portion provided at a position closer to the other of said lenses than said convex lens portion.
    said cylindrical lens portion being so disposed as to perform a light-condensing action in a direction orthogonal to a direction connecting said light-projecting lens and said light-receiving lens.

21. The photoelectric switch according to claim 20, wherein said cylindrical lens portion has a surface inclined in such a manner that the thickness of the cylindrical lens portion is reduced toward the convex lens portion in a direction connecting the light-projecting lens and light-receiving lens.

22. The photoelectric switch according to claim 20, wherein at least one of said light-projecting lens and said light-receiving lens is a Fresnel lens.

23. A reflective-type photoelectric switch comprising:
    a light-emitting element;
    a light-projecting lens for projecting emitted light from said light-emitting element toward a detection zone;
    a light-receiving element; and
    a light-receiving lens for guiding reflected light from an object to be detected, which is located in the detection zone, toward said light-receiving element;
    said light-receiving lens being cylindrical lens which performs a light-condensing action in a direction orthogonal to a direction connecting said light-projection lens and said light-receiving lens.

24. The photoelectric switch according to claim 23, wherein said cylindrical lens is a Fresnel cylindrical lens.

* * * * *